(12) United States Patent
Nedrelid

(10) Patent No.: US 11,780,740 B2
(45) Date of Patent: Oct. 10, 2023

(54) SYSTEM OF FILTERING RUNOFF WATER FROM A ROOF CLEANING

(71) Applicant: Nils Nedrelid, Vero Beach, FL (US)

(72) Inventor: Nils Nedrelid, Vero Beach, FL (US)

(*) Notice: Subject to any disclaimer, the term of this patent is extended or adjusted under 35 U.S.C. 154(b) by 653 days.

(21) Appl. No.: 17/005,161

(22) Filed: Aug. 27, 2020

(65) Prior Publication Data
US 2022/0064912 A1   Mar. 3, 2022

(51) Int. Cl.
*C02F 1/00* (2023.01)
*B65D 47/32* (2006.01)
*B65D 41/34* (2006.01)
*E03B 3/02* (2006.01)
*C02F 101/00* (2006.01)
*C02F 103/00* (2006.01)
*A45F 3/16* (2006.01)

(52) U.S. Cl.
CPC .............. *C02F 1/003* (2013.01); *B65D 41/34* (2013.01); *B65D 47/32* (2013.01); *E03B 3/02* (2013.01); *A45F 2003/163* (2013.01); *C02F 2101/00* (2013.01); *C02F 2103/001* (2013.01); *C02F 2307/02* (2013.01)

(58) Field of Classification Search
CPC   C02F 1/003; C02F 2101/00; C02F 2103/001; C02F 2307/02; B65D 41/34; B65D 47/32; B65D 47/243; E03B 3/02; A45F 2003/163
USPC .............................................. 52/12
See application file for complete search history.

(56) References Cited

U.S. PATENT DOCUMENTS

| | | | | |
|---|---|---|---|---|
| 6,619,312 B2* | 9/2003 | Doiron | ...................... | E03B 3/02 |
| | | | | 137/122 |
| 7,550,077 B2* | 6/2009 | Graf | ....................... | E04D 13/08 |
| | | | | 52/12 |
| 2006/0237369 A1* | 10/2006 | Kirts | ...................... | B01D 21/34 |
| | | | | 210/681 |
| 2011/0266201 A1* | 11/2011 | Perez | ..................... | B01D 35/26 |
| | | | | 210/171 |
| 2012/0222998 A1* | 9/2012 | Pierzchalski | ............. | E03B 3/02 |
| | | | | 210/170.03 |
| 2013/0193047 A1* | 8/2013 | Catt Lyon | ................. | E03B 3/02 |
| | | | | 210/170.03 |
| 2013/0220901 A1* | 8/2013 | Garios | .................... | C02F 1/004 |
| | | | | 210/86 |
| 2017/0001132 A1* | 1/2017 | Garios | ................... | C02F 1/004 |

* cited by examiner

*Primary Examiner* — Mark R Wendell

(57) ABSTRACT

A system of filtering runoff water from a roof cleaning is used to remove contaminants from water that has been used for rooftop cleaning. The system is also configured to gather water noninvasively from downspouts or topographically low points upon the roof. The system of filtering runoff water from a roof cleaning utilizes a pump that is connected to a large bin for filtration. The pump is placed at a low point upon the rooftop, thus enabling optimal water collection for subsequent pumping. The bin contains a disposable filter through which pumped water may pass, either through force from the pump pressure or due to the effects of gravity. Clean water is then ejected from the bin, or otherwise guided to an appropriate drainage area. This arrangement allows for easy maintenance, as a rooftop cleaner need only to swap out the old filter for a new one after cleaning.

14 Claims, 7 Drawing Sheets

SYSTEM OF FILTERING RUNOFF WATER FROM A ROOF CLEANING

FIELD OF THE INVENTION

The present invention relates generally to a water filtration device. More specifically, the system of filtering runoff water from a roof cleaning relates to a tool capable of removing water contaminants generated from pressure washing rooftops during cleaning. The present invention is able to capture contaminated water before it drains from the roof and pump that water through a filter.

BACKGROUND OF THE INVENTION

Over the course of the lifetime of the rooftop of a commercial or residential building, the roof collects a large amount of dirt, dust, and various debris. This material may have hazardous effects, such as the potential for smells to accumulate and, in extreme cases, rooftop damage due to increased rooftop weight, if left unchecked. Among the filth that can accumulate is material from the roof itself. Many membranes used with low sloped roofs contain rubber, plastics and rubber modified asphalts. Rubbers and plastics have long been known to experience degradation due to continuous solar radiation. Engineers and analysts have determined that it is still more cost-effective to employ these materials as common roofing materials. Rather than counteracting these effects, the solution is often to perform scheduled maintenance on these rooftops at regular intervals. Such maintenance commonly involves, among other potential steps, power-washing the roof with pressurized water. This proves to be effective for removing excessive material from the roof and leaving the rooftop reasonably clean.

However, such cleaning has undesirable side effects. The resultant slurry of debris contains a variety of chemicals and particulates that are environmentally harmful. Beyond the expected contamination from dust and dirt, rooftop rubbers and plastics are not biodegradable, and therefore form very environmentally hazardous runoff, known as micro-plastics. What is needed is a device that filters hazardous waste material from the post-washing slurry and releases cleaned water from the roof. Further desirable is a device that is non-invasive and energy efficient.

The present invention addresses these issues. The system of filtering runoff water from a roof cleaning utilizes a pump that is connected to a large bin for filtration. The pump is placed at a topographically low point upon the rooftop, thus enabling optimal water collection for subsequent pumping. The bin contains a disposable filter through which pumped water may pass, either through force from the pump pressure or due to the effects of gravity. Clean water is then ejected from the bin, or otherwise guided to an appropriate drainage area. This arrangement allows for easy maintenance, as a rooftop cleaner need only to pressure clean the roof as usual and then swap out the old filter for a new one.

DETAILED DESCRIPTION OF THE INVENTION

All illustrations of the drawings are for the purpose of describing selected versions of the present invention and are not intended to limit the scope of the present invention.

Figure 1:
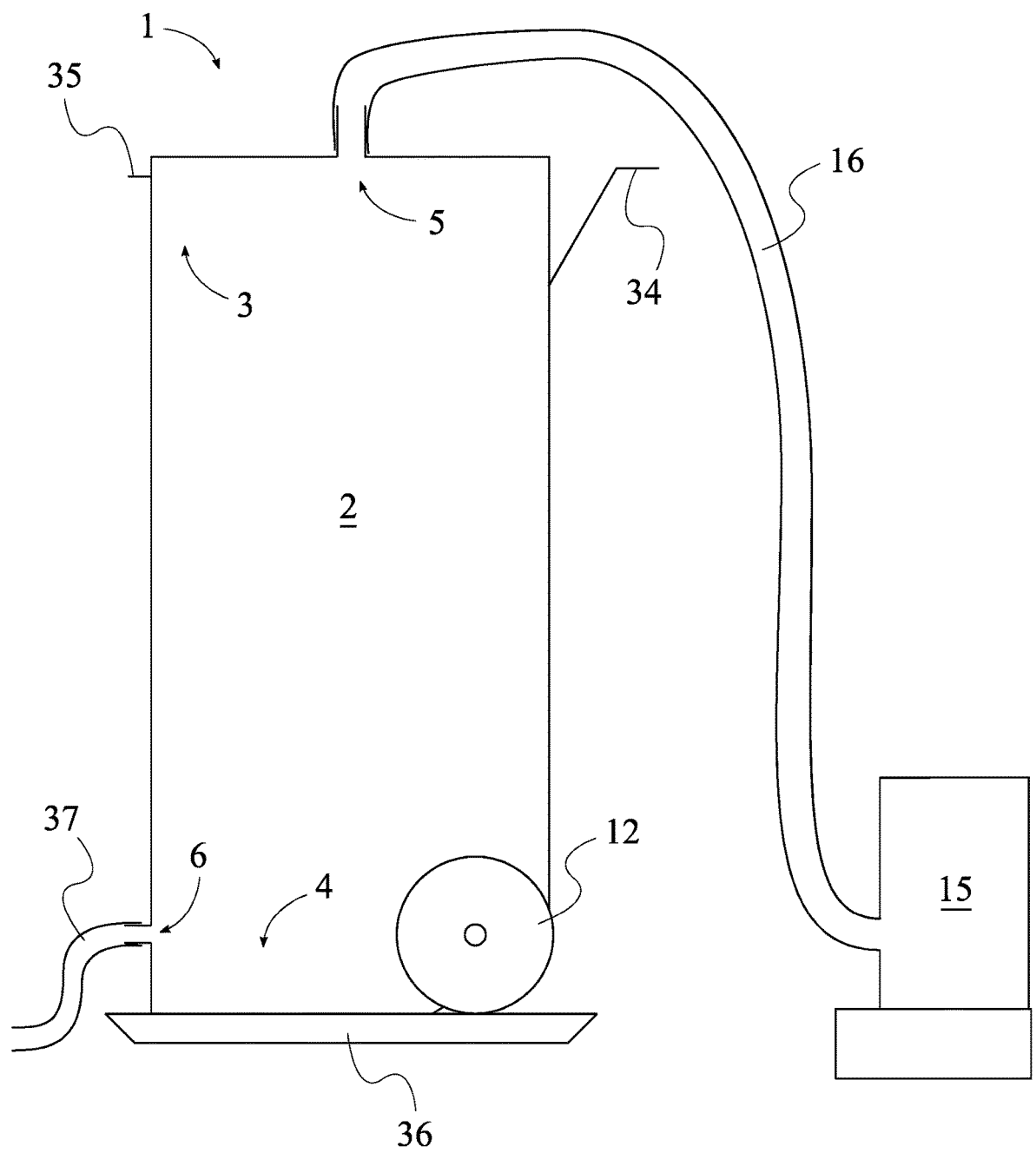
FIG. 1 is a schematic diagram representing an overall view of the present invention.

The present invention is a system of filtering runoff water from a roof cleaning that is used to remove contaminants from water that has been used for rooftop cleaning. The present invention is also configured to gather water noninvasively from downspouts or topographically low points upon the roof. A preferred embodiment of the present invention comprises a hopper 1, at least one sump pump 15, and a first transfer hose 16, as seen in FIG. 1. The hopper 1 relates to a bin or container large enough to contain waste material collected during filtration. The at least one sump pump 15 relates to a liquid pumping tool capable of pressurizing water against gravitational forces into the hopper 1. The first transfer hose 16 is a pressure-resistant tube through which dirty water may travel. The hopper 1 comprises a housing 2, an inlet 5, an outlet 6, a straining basket 7, and a filtering bag 9. The housing 2 encloses the volume of space occupied by the hopper 1. The inlet 5 relates to an opening optimized for receipt of fluid from the first transfer hose 16. The outlet 6 is an opening through which filtered water may exit the hopper 1. The straining basket 7 is a unit capable of removing larger debris during the water filtration process. The filtering bag 9 relates to a preferably disposable liquid filter optimized for separation of dirt, dust, animal excrement, rooftop chemicals, and other debris and contaminants of various sizes from water. The housing 2 comprises an upper portion 3 and a lower portion 4. The upper portion 3 relates to the section of the housing 2 with the highest gravitational potential energy, therefore ideal for allowing contaminated water to fall through the filter. The lower portion 4 relates to the section of the housing 2 preferably proximal to or in contact with the roof or with an elevated surface, thereby providing structural support for the housing 2.

Figure 2:
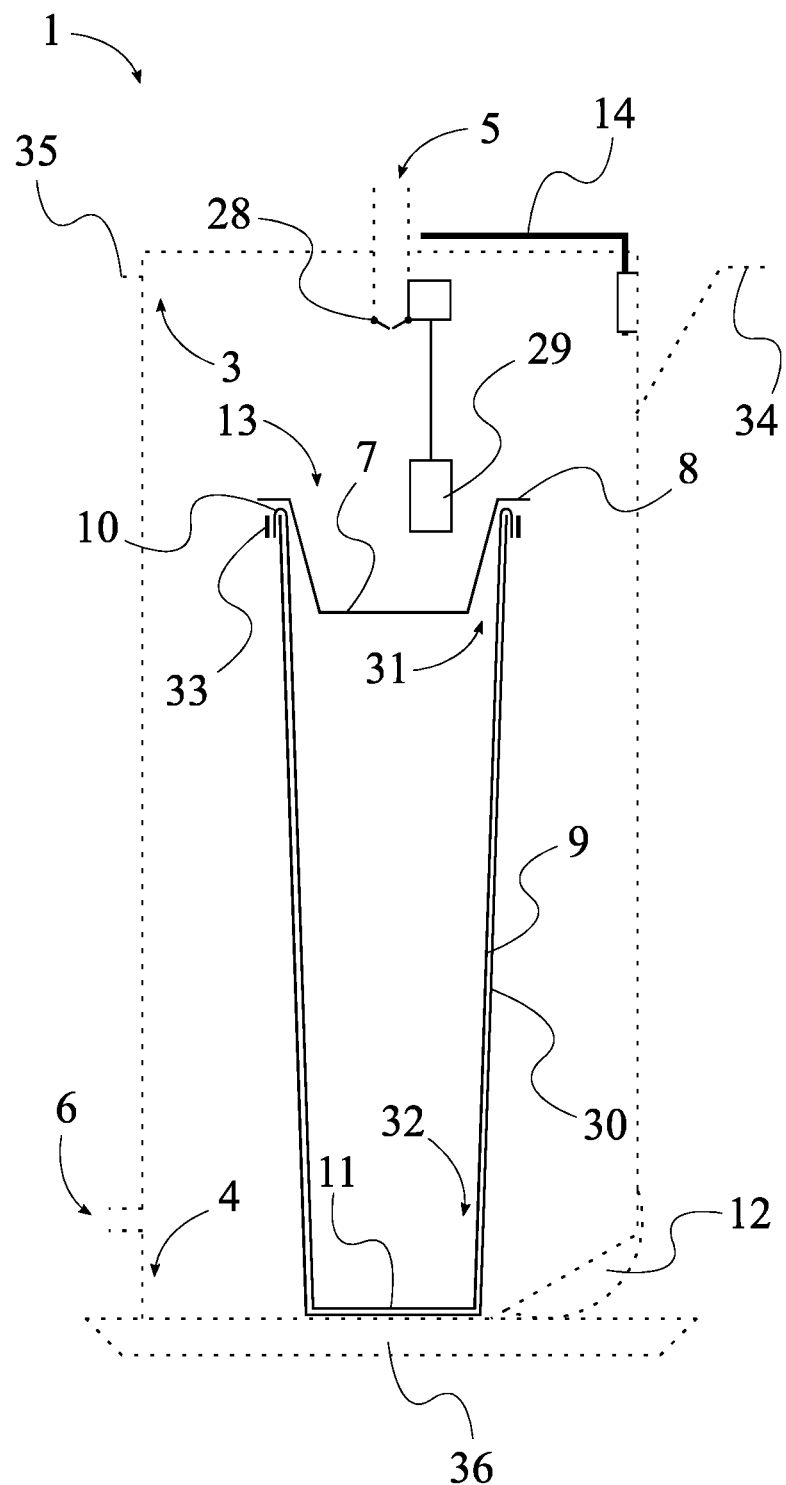
FIG. 2 is a schematic diagram representing an internal view of the hopper of the present invention.

The general configuration of the aforementioned components allows the present invention to efficiently and effectively remove contaminants from water after a rooftop cleaning. The straining basket 7 and the filtering bag 9 are mounted within the housing 2, as seen in FIG. 2. This arrangement allows the housing 2 to protect the straining basket 7 and the filtering bag 9 from damage due to external stimuli. The straining basket 7 is positioned in between the inlet 5 and the filtering bag 9. In this way, the straining basket 7 can remove larger contaminants before the larger contaminants can enter the filtering bag 9. The at least one sump pump 15 is positioned offset from the housing 2. This arrangement allows the at least one sump pump 15 to leverage topographically lower areas of the roof, thus maximizing ambient water volume, while the housing 2 can be positioned at elevated areas of the roof. The at least one sump pump 15 is in fluid communication with the inlet 5 by the first transfer hose 16. This arrangement allows contaminated water to flow from the at least one sump pump 15 to the inlet 5. The inlet 5, the straining basket 7, the filtering bag 9, and the outlet 6 are in serial fluid communication with each other through the housing 2. In this way, the fluid flows through the housing 2 across both the straining basket 7 and the filtering bag 9, removing contaminants as the water approaches the outlet 6.

Figure 5:
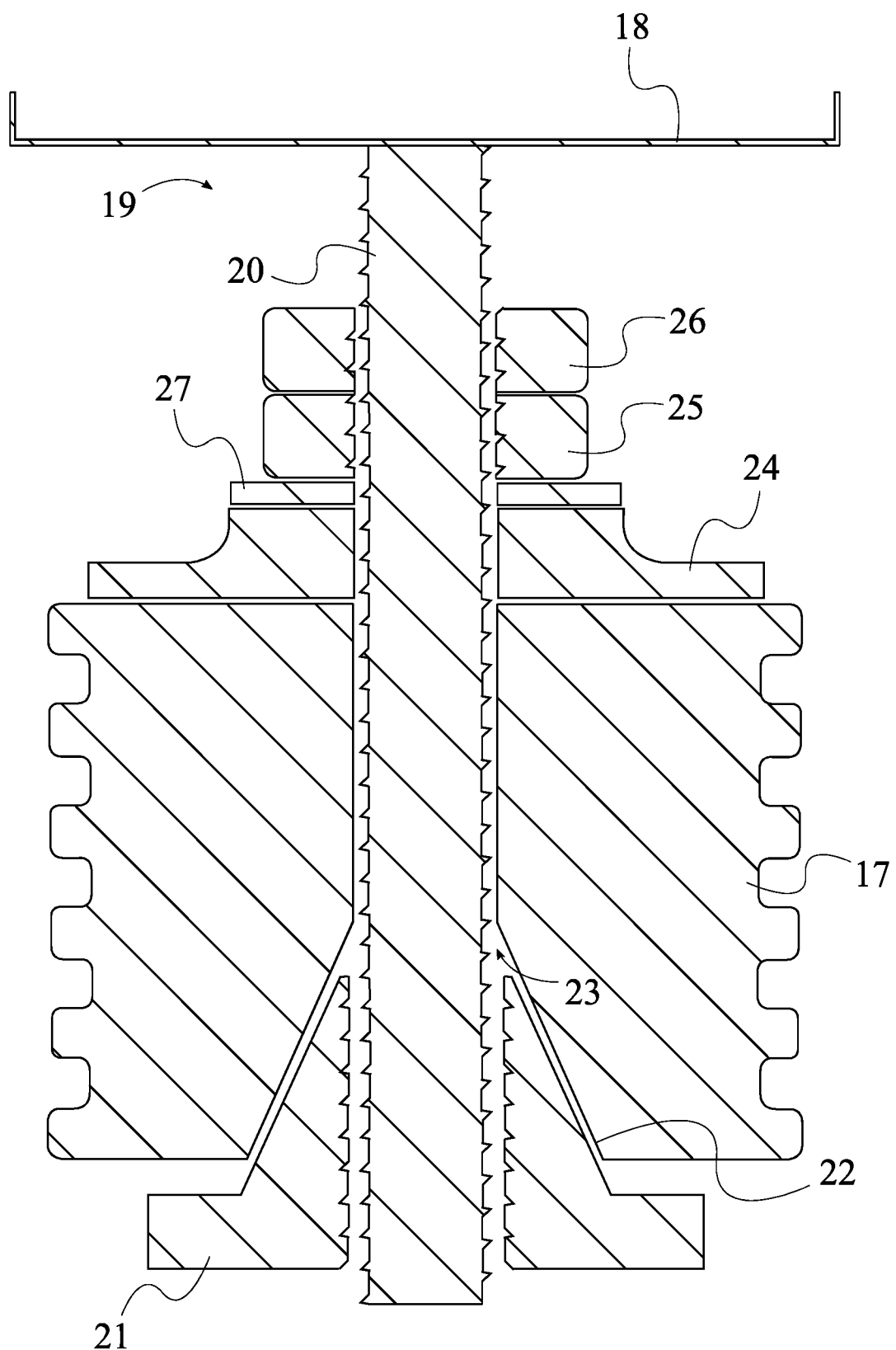
FIG. 5 is a schematic diagram representing the drain plug of the present invention, wherein the drain plug is in a neutral state.
Figure 6:
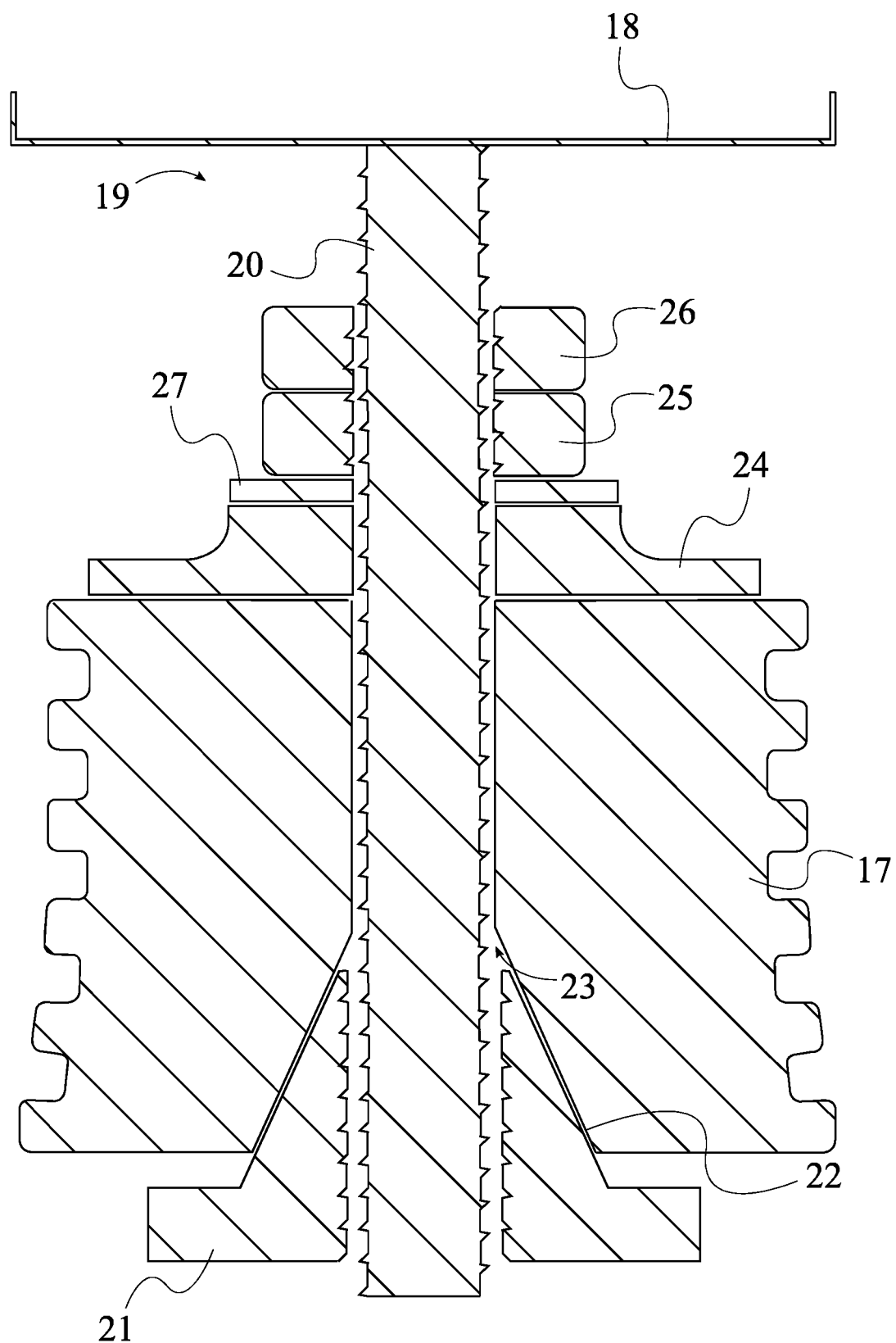
FIG. 6 is a schematic diagram representing the drain plug of the present invention, wherein the drain plug is in an expanded state.
Figure 7:
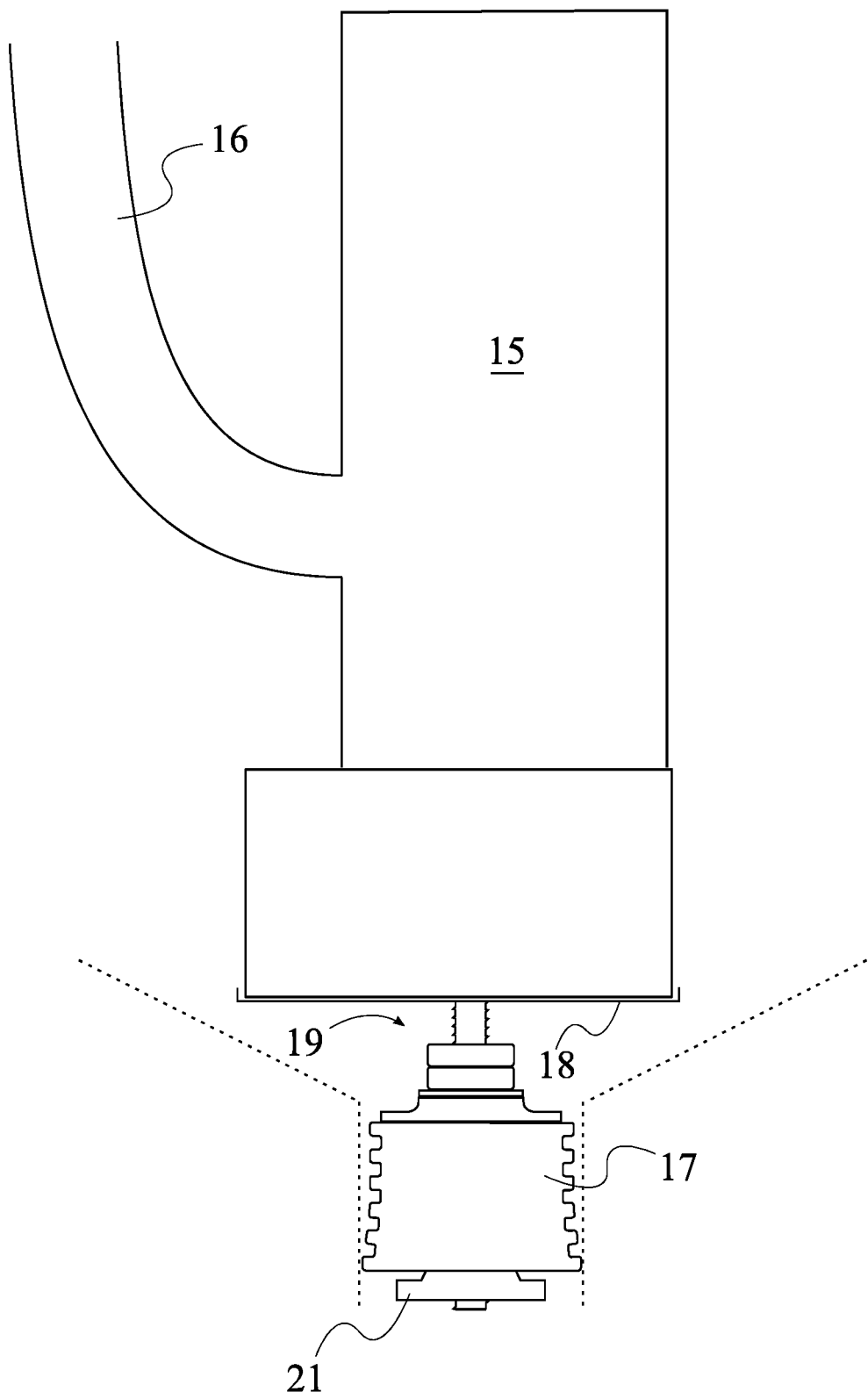
FIG. 7 is a schematic diagram representing the drain plug and the sump pump of the present invention.

The present invention must capture water used to clean the roof before that water exits through a gutter or wastewater disposal chute. In order to prevent contaminated water from exiting the roof area, the present invention may further comprise a drain plug 17, a pump platform 18, and a height-adjustment mechanism 19, as seen in FIG. 5-7. The drain plug 17 relates to a preferably polymeric or rubber device capable of preventing the flow of fluid into pipes, gutters, and other common rooftop drainage systems. In an exemplary embodiment, the drain plug 17 may further comprise a plurality of ridges. The plurality of ridges is a set of annular protrusions extending across the drain plug 17 that increases the frictional gripping forces applied to the drain plug 17 when the drain plug 17 is fit into a pipe or tube. The pump platform 18 relates to a surface which supports the at least one sump pump 15 above the drain plug 17. The height-adjustment mechanism 19 relates to a device which can adjust the vertical position of the pump platform 18 above the drain plug 17. The at least one sump pump 15 is mounted onto the pump platform 18. This arrangement allows the position of the at least one sump pump 15 relative to the drain plug 17 to be adjusted with the position of the pump platform 18. The height-adjustment mechanism 19 is mounted onto the pump platform 18, opposite the at least one sump pump 15. In this way, modifications to the height-adjustment mechanism 19 result in changes to the position of the at least one sump pump 15 through the pump platform 18. The drain plug 17 is mounted offset from the pump platform 18 by the height-adjustment mechanism 19. This arrangement ensures that modifications to the height-adjustment mechanism 19 result in changes to the position of the pump platform 18 relative to the drain plug 17.

The height-adjustment mechanism 19 must be capable of both modifying the distance between the drain plug 17 and the pump platform 18 as well as securing the drain plug 17 in place within a gutter or pipe. To accomplish this, the height-adjustment mechanism 19 may comprise a threaded shaft 20, an annular wedge 21, a conical cavity 22, a plug channel 23, an annular plate 24, and a first nut 25, as seen in FIGS. 5 and 6. The threaded shaft 20 relates to a male threaded unit which may engage with other threaded components. The annular wedge 21 denotes a rigid body against which the drain plug 17 may press in order to effectively expand a bottom portion radius of the drain plug 17 to better fit within a tube or pipe. The conical cavity 22 relates to a conical cut into the drain plug 17 which improves the effectiveness of the annular wedge 21. The plug channel 23 describes a generally cylindrical cut into the drain plug 17 which enables positioning of the threaded shaft 20. The annular plate 24 relates to a rigid, generally disk-shaped unit intended to press against the drain plug 17. The first nut 25 relates to a threaded device which can apply pressure onto the annular plate 24 in order to push the plate along the threaded shaft 20. The annular wedge 21 is terminally positioned along the threaded shaft 20. This arrangement allows the annular wedge 21 to support the drain plug 17 against gravitational forces. The annular wedge 21 is threadably engaged to the threaded shaft 20. In this way, the annular wedge 21 is secured in place along the threaded shaft 20. The plug channel 23 traverses through the drain plug 17. In this way, the threaded shaft 20 fits within the drain plug 17. The conical cavity 22 is terminally integrated into the plug channel 23. This arrangement enables the conical cavity 22 to interact appropriately with the annular wedge 21. The annular wedge 21 is operatively coupled to the conical cavity 22, wherein the annular wedge 21 is used to selectively engage the conical cavity 22 and consequently enlarge a plugging width of the drain plug 17. Thus, motion forcing the conical cavity 22 towards the annular wedge 21 enables expansion of the drain plug 17 within a tube or pipe, as can be seen going from FIG. 5 to FIG. 6. The annular plate 24 is pressed against the drain plug 17, opposite the annular wedge 21. This arrangement enables the annular plate 24 to hold the drain plug 17 in place. The threaded shaft 20 is positioned through the drain plug 17 and the annular plate 24. In this way, the threaded shaft 20 may arrange the annular plate 24 in an appropriate position relative to the drain plug 17. The first nut 25 is terminally positioned along the threaded shaft 20, opposite the annular wedge 21. Thus, the first nut 25 may be used to apply pressure to the annular plate 24, and consequently, the drain plug 17. The first nut 25 is threadably engaged to the threaded shaft 20. Therefore, the first nut 25 may tighten through the application of torque into a position that increases the pressure upon the annular plate 24.

The height-adjustment mechanism 19 may further require a system for securing the first nut 25 in place during use. To this end, the height-adjustment mechanism 19 may further comprise a second nut 26 and a washer 27. The second nut 26 relates to a threaded device which can apply pressure onto the first nut 25 to keep the first nut 25 in place. The washer 27 is a disk-shaped unit capable of evenly distributing force from the first nut 25 onto the annular plate 24, thus preventing mechanical damage. The washer 27 is pressed against the annular plate 24, opposite the drain plug 17. This arrangement positions the washer 27 for appropriate distribution of force from the first nut 25. The second nut 26 is threadably engaged to the threaded shaft 20. Thus, the second nut 26 may shift position along the threaded shaft 20 in response to the application of torque. The second nut 26 is pressed against the washer 27 by the first nut 25. In this way, the first nut 25 and the second nut 26 remain fixed in place during use of the present invention.

If the straining basket 7 and the filtering bag 9 become too full, the present invention will not be able to filter water effectively and pressure buildups could damage the at least one sump pump 15 or the hopper 1. To prevent this, the present invention may further comprise an automated shutoff valve 28 and an overflow sensor 29, as seen in FIG. 2. The automated shutoff valve 28 relates to a mechanism capable of moderating the amount of fluid entering the hopper 1. The overflow sensor 29 relates to an electronic device capable of detecting the presence of fluid and sending an electrical signal in response to that presence. The automated shutoff valve 28 and the overflow sensor 29 are positioned within the upper portion 3. In this way, excessive fluid can be measured relative to a distance from the ground at which water is being captured. The inlet 5 is in fluid communication with the automated shutoff valve 28. Thus, the inlet 5 can be opened or closed at the discretion of the automated shutoff valve 28. The overflow sensor 29 is mounted adjacent to the inlet 5. This arrangement ensures that the overflow sensor 29 does not activate until water content within the straining basket 7 and the filtering bag 9 is at an unsustainable level for continued operation of the hopper 1. The overflow sensor 29 is electronically connected to the automated shutoff valve 28. In this way, the automated shutoff valve 28 may respond to electronic signals from the overflow sensor 29. In an exemplary embodiment, the present invention may further comprise a controller. The controller relates to a device capable of reading electronic signal inputs, processing and storing information, and relaying appropriate electronic responses to the appropriate components. The automated shutoff valve 28 and the overflow sensor 29 are electronically connected to the controller. This arrangement enables the controller to provide both electronic power and appropriate signal relaying between the automated shutoff valve 28 and the overflow sensor 29.

The filtering bag 9 must remain in place during the filtration process against the flow of contaminated water. To achieve this, the present invention may further comprise a bag basket 30, as seen in FIG. 2. The bag basket 30 is used to structurally support the filtering bag 9 throughout the hopper 1. The filtering bag 9 comprises an opening rim 10 and a bag base 11. The opening rim 10 relates to the space through which fluid may enter the filtering bag 9. The bag base 11 relates to the bottom section of the filtering bag 9 opposite the opening rim 10. The bag basket 30 comprises an open basket end 31 and a closed basket end 32. The open basket end 31 relates to the space through which a filtering bag 9 may enter the bag basket 30. The closed basket end 32 is the section of the bag basket 30 against which the filtering bag 9 may rest during use. The bag basket 30 is mounted within the housing 2. This arrangement allows the housing 2 to structurally support the walls of the bag basket 30. The open basket end 31 is positioned adjacent to the inlet 5. In this way, fluid exiting the inlet 5 may immediately enter the bag basket 30. The closed basket end 32 is positioned adjacent to the outlet 6. Thus, fluid that has been filtered may immediately exit the hopper 1 after exiting the bag basket 30. The filtering bag 9 is sheathed by the bag basket 30. This arrangement enables the filtering bag 9 to filter all the fluid that enters the bag basket 30 from the inlet 5. The opening rim 10 is mounted around the open basket end 31. In this way, the filtering bag 9 is held in place by the bag basket 30. The bag base 11 is pressed against the closed basket end 32. This arrangement enables the closed basket end 32 to provide support to the bag base 11, which can become heavy after several cycles of water filtration.

Figure 3:
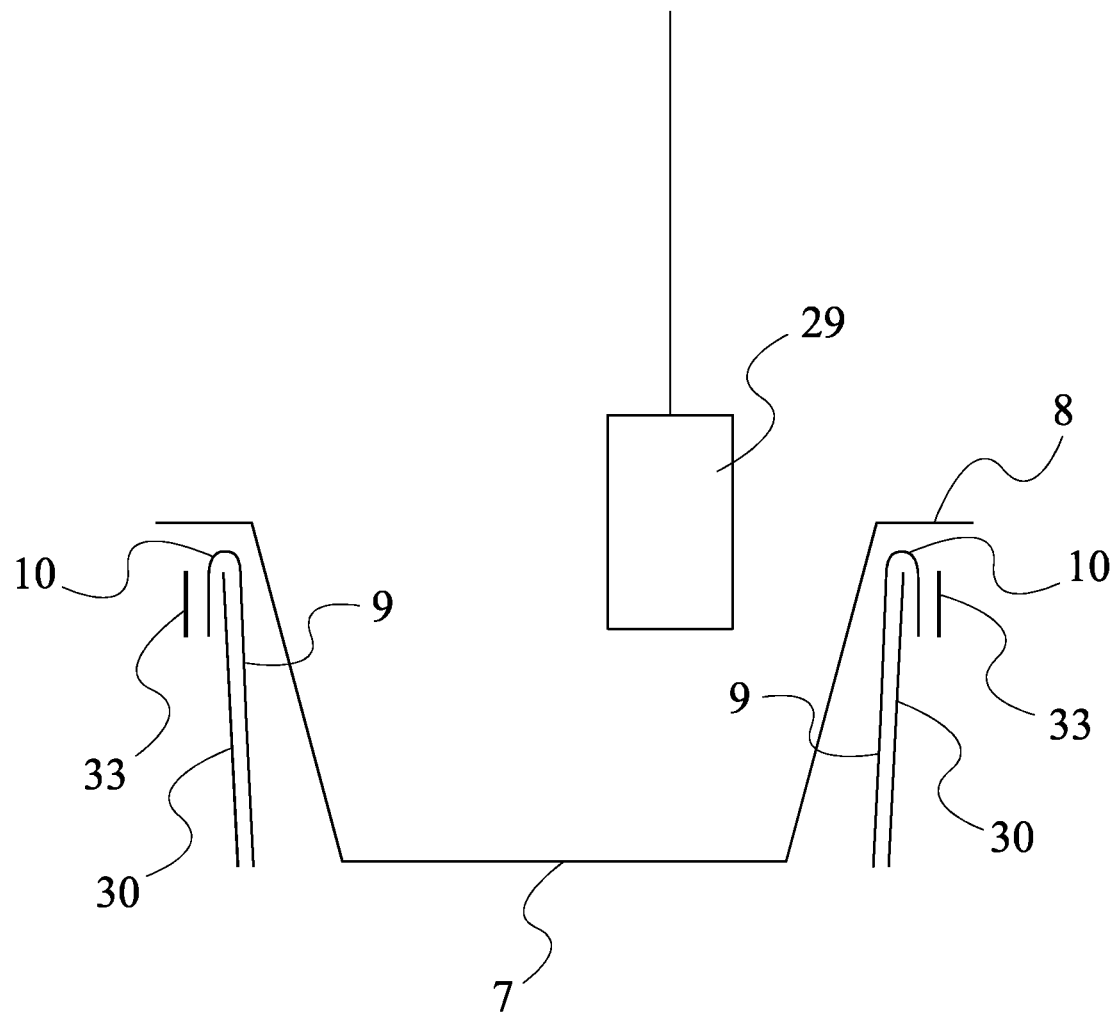
FIG. 3 is a schematic diagram representing the straining basket of the present invention.
Figure 4:
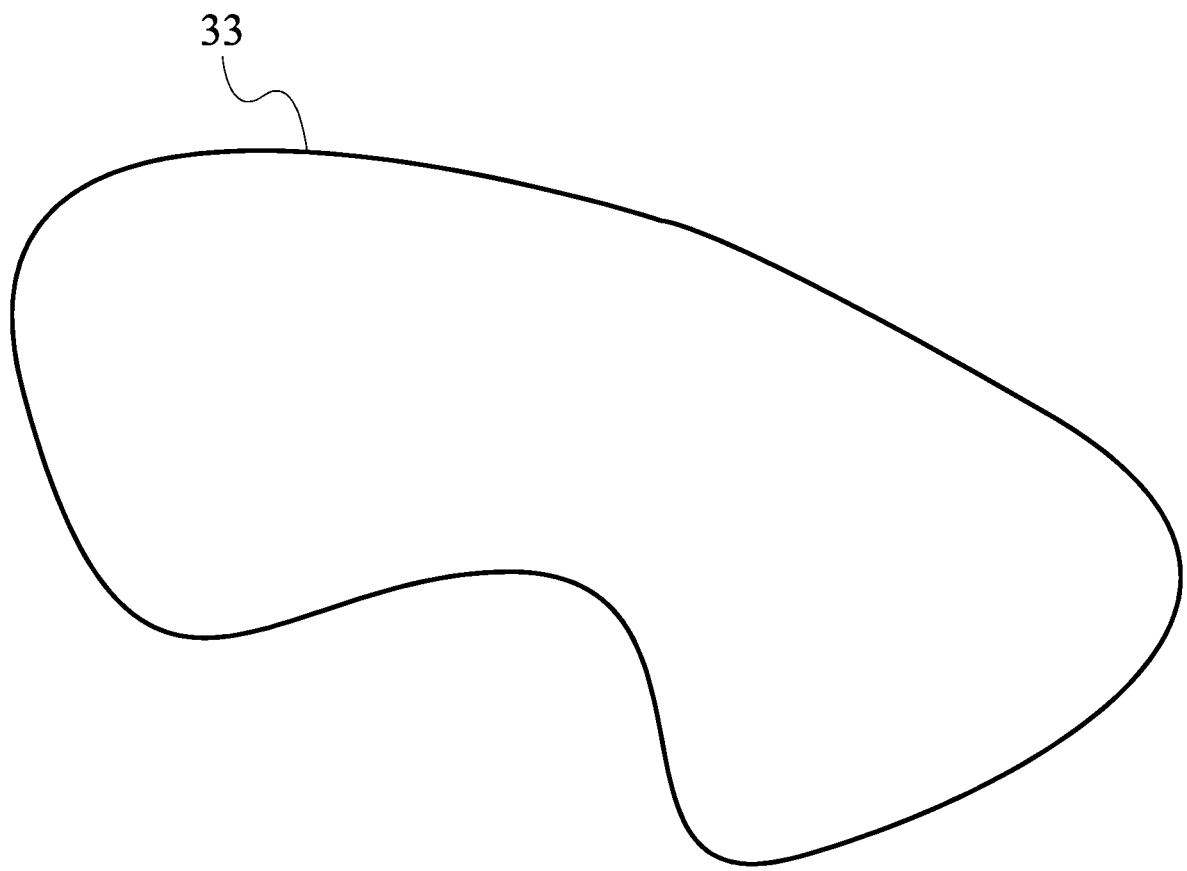
FIG. 4 is a schematic diagram representing the retention strap of the present invention.

The straining basket 7 must be positioned to filter larger items and particles from the contaminated water before the fluid enters the filtering bag 9. To achieve this, the straining basket 7 may comprise a support rim 8, as seen in FIG. 3. The support rim 8 relates to a flat extrusion extending radially from the straining basket 7 that allows for support of the straining basket 7 relative to the bag basket 30. The support rim 8 is mounted around the open basket end 31. This arrangement allows the straining basket 7 to be held in an appropriate position during water filtration relative to the filtering bag 9. The filtering bag 9 may have a tendency to slide or shift during the water filtration process. To prevent this, the present invention may further comprise a retention strap 33, as seen in FIG. 4. The retention strap 33 denotes a preferably elastic band capable of providing radially-directed force to the filtering bag 9. The retention strap 33 is positioned around the open basket end 31. In this way, the retention strap 33 is positioned optimally for connection to the filtering bag 9. The opening rim 10 is attached around the open basket end 31 by the retention strap 33. Thus, the retention strap 33 secures the opening rim 10, and therefore the filtering bag 9, in place during the water filtration process. The retention strap 33 can also be removed in order to readily detach the filtering bag 9 from the open basket end 31.

A user of the present invention may need to move the hopper 1 to different locations, based upon the size of the roof and other such considerations. To enable this, the present invention may further comprise a tilting handle 34, as seen in FIG. 1. The tilting handle 34 is a rigid extrusion extending from the hopper 1 that allows for convenient and intuitive grasping of the hopper 1. The hopper 1 may further comprise a tilting wheel assembly 12. The tilting wheel assembly 12 relates to a set of wheels that can be used to facilitate transportation of the hopper 1 across a roof or other surface. The tilting wheel assembly 12 is laterally mounted to the lower portion 4. This arrangement ensures that the hopper 1 can be tilted about the tilting wheel assembly 12. The tilting handle 34 is laterally mounted to the upper portion 3. In this way, the user may grasp the tilting handle 34 and tilt the hopper 1 onto the tilting wheel assembly 12 in order to push or pull the hopper 1 to a new position.

The user likely does not wish to get wet while transporting the hopper 1 between locations. To accommodate for this, the tilting wheel assembly 12 and the outlet 6 are positioned opposite to each other about the housing 2. This arrangement ensures that the tilting wheel assembly 12 will not get wet while moving. Furthermore, the tilting handle 34 and the outlet 6 are also positioned opposite to each other about the housing 2, as seen in FIG. 1. In this way, the user may tilt the hopper 1 using the tilting handle 34 and the tilting wheel assembly 12 without being at risk of getting wet or leaking fluid while moving.

In many instances, it may be advantageous for the user to lift the hopper 1 directly and replace it in a new position. To enable this, the present invention may further comprise a plurality of lifting features 35, as seen in FIG. 1. The plurality of lifting features 35 relates to a set of extrusions extending from the hopper 1 that provide a grasping structure for the user. The plurality of lifting features 35 is laterally mounted to the upper portion 3. This arrangement provides the user with adequate and convenient leverage for lifting. The plurality of lifting features 35 is distributed about the upper portion 3. In this way, the user is able to lift and move the hopper 1 manually at the user's convenience.

The filtering bag 9 must be replaced between uses, or as the filtering bag 9 becomes full of waste material. To achieve this, the hopper 1 may further comprise a bag-replacement opening 13 and a hatch 14, as seen in FIG. 2. The bag-replacement opening 13 relates to the space through which a user may insert or remove a filtering bag 9. The hatch 14 is an arm, door, or other such fixture positioned to allow selective access to the contents of the bag-replacement opening 13. The bag-replacement opening 13 traverses into the upper portion 3. This arrangement enables the user to add or remove a filtering bag 9 through the upper portion 3 of the hopper 1. The hatch 14 is positioned adjacent to the bag-replacement opening 13. In his way, the hatch 14 is positioned appropriately to manage access to the bag-replacement opening 13. The hatch 14 is operatively mounted to the upper portion 3, wherein the hatch 14 is used to toggle access to the bag-replacement opening 13. Thus, the hatch 14 must be swiveled, pivoted, or otherwise shifted out of the way in order to remove the filtering bag 9 from the bag-replacement opening 13.

During use, it is possible for leaks or other water-related incidents to occur. To prevent such accidents from causing an undue mess, the present invention may further comprise a spill tray 36, as seen in FIG. 1. The spill tray 36 is a container capable of retaining overflowing or otherwise escaping water from the hopper 1. The lower portion 4 is situated upon the spill tray 36. This arrangement ensures that the spill tray 36 is positioned appropriately to manage overflowing water from the hopper 1. The outlet 6 is positioned offset from the spill tray 36. Thus, in the event of a leak from water escaping the outlet 6, the spill tray 36 can capture excess water.

Upon successfully filtering and cleaning the water, the water must be guided off of the roof. To enable this, the present invention may further comprise a second transfer hose 37, as seen in FIG. 1. The second transfer hose 37 is a tube capable of guiding water away from the hopper 1. The outlet 6 is terminally and hermetically attached to the second transfer hose 37. This arrangement ensures that water that has been through the filtering bag 9 and the straining basket 7 can exit from the hopper 1 to a new destination.

Although the invention has been explained in relation to its preferred embodiment, it is to be understood that many other possible modifications and variations can be made without departing from the spirit and scope of the invention as hereinafter claimed.

What is claimed is:

1. A system of filtering runoff water from a roof cleaning comprises:
    a hopper;
    at least one sump pump;
    a first transfer hose;
    the hopper comprises a housing, an inlet, an outlet, a straining basket, and a filtering bag;
    the housing comprises an upper portion and a lower portion;
    the inlet being integrated into the upper portion;
    the outlet being integrated into the lower portion;
    the straining basket and the filtering bag being mounted within the housing;
    the straining basket being positioned in between the inlet and the filtering bag;
    the at least one sump pump being positioned offset from the housing;
    the at least one sump pump being in fluid communication with the inlet by the first transfer hose; and
    the inlet, the straining basket, the filtering bag, and the outlet being in serial fluid communication with each other through the housing.

2. The system of filtering runoff water from a roof cleaning as claimed in claim 1 comprises:
    a drain plug;
    a pump platform;
    a height-adjustment mechanism;
    the at least one sump pump being mounted onto the pump platform;
    the height-adjustment mechanism being mounted onto the pump platform, opposite the at least one sump pump; and
    the drain plug being mounted offset from the pump platform by the height-adjustment mechanism.

3. The system of filtering runoff water from a roof cleaning as claimed in claim 2 comprises:
    the height-adjustment mechanism comprises a threaded shaft, an annular wedge, a conical cavity, a plug channel, an annular plate, and a first nut;
    the annular wedge being terminally positioned along the threaded shaft;
    the annular wedge being threadably engaged to the threaded shaft;
    the plug channel traversing through the drain plug;
    the conical cavity being terminally integrated into the plug channel;
    the annular wedge being operatively coupled to the conical cavity, wherein the annular wedge is used to selectively engage the conical cavity and consequently enlarge a plugging width of the drain plug;
    the annular plate being pressed against the drain plug, opposite the annular wedge;
    the threaded shaft being positioned through the drain plug and the annular plate;
    the first nut being terminally positioned along the threaded shaft, opposite the annular wedge; and
    the first nut being threadably engaged to the threaded shaft.

4. The system of filtering runoff water from a roof cleaning as claimed in claim 3 comprises:
    the height-adjustment mechanism further comprises a second nut and a washer;
    the washer being pressed against the annular plate, opposite the drain plug;
    the second nut being threadably engaged to the threaded shaft; and
    the second nut being pressed against the washer by the first nut.

5. The system of filtering runoff water from a roof cleaning as claimed in claim 1 comprises:
    an automated shutoff valve;
    an overflow sensor;
    the automated shutoff valve and the overflow sensor being positioned within the upper portion;
    the inlet being in fluid communication with the automated shutoff valve;
    the overflow sensor being mounted adjacent to the inlet; and
    the overflow sensor being electronically connected to the automated shutoff valve.

6. The system of filtering runoff water from a roof cleaning as claimed in claim 1 comprises:
    a bag basket;
    the filtering bag comprises an opening rim and a bag base;
    the bag basket comprises an open basket end and a closed basket end;
    the bag basket being mounted within the housing;
    the open basket end being positioned adjacent to the inlet;
    the closed basket end being positioned adjacent to the outlet;
    the filtering bag being sheathed by the bag basket;
    the opening rim being mounted around the open basket end; and
    the bag base being pressed against the closed basket end.

7. The system of filtering runoff water from a roof cleaning as claimed in claim 6 comprises:
    the straining basket comprises a support rim; and
    the support rim being mounted around the open basket end.

8. The system of filtering runoff water from a roof cleaning as claimed in claim 6 comprises:
    a retention strap;
    the retention strap being positioned around the open basket end; and
    the opening rim being attached around the open basket end by the retention strap.

9. The system of filtering runoff water from a roof cleaning as claimed in claim 1 comprises:
    a tilting handle;
    the hopper further comprises a tilting wheel assembly;

the tilting wheel assembly being laterally mounted to the lower portion; and the tilting handle being laterally mounted to the upper portion.

10. The system of filtering runoff water from a roof cleaning as claimed in claim 9 comprises:

the tilting wheel assembly and the outlet being positioned opposite to each other about the housing; and the tilting handle and the outlet being positioned opposite to each other about the housing.

11. The system of filtering runoff water from a roof cleaning as claimed in claim 1 comprises:

a plurality of lifting features;

the plurality of lifting features being laterally mounted to the upper portion; and the plurality of lifting features being distributed about the upper portion.

12. The system of filtering runoff water from a roof cleaning as claimed in claim 1 comprises:

the hopper further comprises a bag-replacement opening and a hatch;

the bag-replacement opening traversing into the upper portion;

the hatch being positioned adjacent to the bag-replacement opening; and the hatch being operatively mounted to the upper portion, wherein the hatch is used to toggle access to the bag-replacement opening.

13. The system of filtering runoff water from a roof cleaning as claimed in claim 1 comprises:

a spill tray;

the lower portion being situated upon the spill tray; and the outlet being positioned offset from the spill tray.

14. The system of filtering runoff water from a roof cleaning as claimed in claim 1 comprises:

a second transfer hose; and the outlet being terminally and hermetically attached to the second transfer hose.

* * * * *